United States Patent
Sung

(10) Patent No.: US 9,317,425 B2
(45) Date of Patent: Apr. 19, 2016

(54) MEMORY MANAGEMENT METHOD IN EMBEDDED SYSTEM

(71) Applicant: Hyundai Motor Company

(72) Inventor: Woosuk Sung, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/509,385

(22) Filed: Oct. 8, 2014

(65) Prior Publication Data
US 2015/0324286 A1  Nov. 12, 2015

(30) Foreign Application Priority Data
May 9, 2014  (KR) ......................... 10-2014-0055517

(51) Int. Cl.
*G06F 12/02* (2006.01)
*G06F 3/06* (2006.01)

(52) U.S. Cl.
CPC .......... *G06F 12/0292* (2013.01); *G06F 3/0608* (2013.01); *G06F 3/0652* (2013.01); *G06F 3/0673* (2013.01); *G06F 12/023* (2013.01); *G06F 2212/1044* (2013.01)

(58) Field of Classification Search
None
See application file for complete search history.

(56) References Cited

U.S. PATENT DOCUMENTS
2009/0276602 A1  11/2009  Chedru

FOREIGN PATENT DOCUMENTS
KR  10-2007-0045612  5/2007
KR  10-2011-0121362  11/2011

*Primary Examiner* — Kevin Verbrugge
(74) *Attorney, Agent, or Firm* — Mintz Levin Cohn Ferris Glovsky and Popeo, P.C.; Peter F. Corless

(57) ABSTRACT

A memory management method in an embedded system is provided. The method includes a first iteration step that sequentially allocates and deletes memory, and recognizes an area where the first to last sections of the memory were located as a hollow space list A second iteration step sequentially allocates the memory in an area of the hollow space list by starting the memory allocation from an end point of the hollow space list. When the hollow space list is insufficient, allocates a memory section outside the area of the hollow space list, re-recognizes the hollow space list by expanding to the area where the last section of the memory was located. When the hollow space list is sufficient during the memory allocation, maintains the hollow space list, and sequentially deletes the allocated memory. Further, an initialization step initializes the hollow space list of when the hollow space list is re-recognized.

13 Claims, 4 Drawing Sheets iteration n+2 iteration n+2

MEMORY MANAGEMENT METHOD IN EMBEDDED SYSTEM

CROSS REFERENCE TO RELATED APPLICATION

The present application claims priority of Korean Patent Application Number 10-2014-0055517 filed on May 9, 2014, the entire contents of which application are incorporated herein for all purposes by this reference.

BACKGROUND

1. Field of the Invention

The present invention relates to a memory management method in an embedded system which prevents memory fragmentation during dynamic memory allocation in the embedded system.

2. Description of the Related Art

After dynamic memory allocation, an operating system (OS) is required to determine which part of the memory is in use. For this purpose, two methods are used. One memory management method uses a bitmap, whereas the other memory management method uses a list First, the memory management method using a bitmap manages memory by dividing the memory into a plurality of allocation units. For instance, one bit corresponds to each of the allocation units. Each of the units is regarded as being available when the bit is 0 and as being in use when the bit is 1. In particular, an important issue is to which size each of the allocation units is to be set. When 4 bytes are set as the allocation unit, a total of 33 bits is required since every one bit corresponds to every four bytes: 4 bytes+1 bit=33 bits. In other words, 32n bits require a bitmap having an n size. In conclusion, it can be appreciated that the bitmap occupies a substantial amount of memory. As a drawback of the memory management method using a bitmap, when a program requests for an n number of allocation units, a memory manager is required to find an n number of continuous sections each of which has 0 bits, which causes a time delay.

In the method using a list, the entry of the list consists of information with which a space can be identified to be hollow or not, a starting address, a length and a next entry pointer. When the memory is in use, P is marked. When the memory is empty, H that represents "hole" is marked. Further, 0 indicates the starting address of the memory, and 5 indicates the size of the memory that is in use and the next entry. When H is marked, the next entry is a hollow space that starts from an address 5 and is empty by the size 3. In addition, when continuous Hs are generated, the number of the entire list may be reduced by incorporating and managing the continuous hollow spaces together. Since this may form a substantially large space, this method may be effective when a substantial amount of space is required. When memory is managed and aligned in this manner, various types of algorithms for allocating the memory space are applied.

However, even in the case of the dynamic memory management using a list, memory may be fragmented, concurrently increasing the maximum memory requirement that must be obtained for processing the operation. Accordingly, in some cases, it may not be possible to properly use resources.

The information disclosed in this section is merely for the enhancement of understanding of the background of the invention, and should not be taken as an acknowledgment or any form of suggestion that this information forms a prior art that would already be known to a person skilled in the art.

SUMMARY

Accordingly, the present invention provides a memory management method in an embedded system which may prevent memory fragmentation during dynamic memory allocation in the embedded system.

In order to achieve the above object, according to one aspect of the present invention, a memory management method in an embedded system is provided. The method may include a first iteration step of sequentially allocating and deleting memory and recognizing an area where the first to last sections of the memory were located as a hollow space list; a second iteration step of sequentially allocating the memory in an area of the hollow space list by starting memory allocation from an end point of the hollow space list, when the hollow space list is insufficient during the memory allocation, allocating a memory section outside (e.g., beyond) the area of the hollow space list, re-recognizing the hollow space list by expanding to the area where the last section of the memory was located, when the hollow space list is sufficient during the memory allocation, maintaining the hollow space list, and sequentially deleting the allocated memory; and an initialization step of, when the hollow space list is re-recognized, initializing the hollow space list According to an exemplary embodiment of the present invention, at the first iteration step, the memory allocation may begin from a first hollow space and, after the first hollow space, sequentially allocating the memory. At the second iteration step, the memory may be sequentially allocated in an opposite direction from an end point to a starting point of the hollow space list. At the second iteration step, when the hollow space list is insufficient, the memory may be allocated to an outside area of the end point of the hollow space list. When the hollow space list is initialized, iteration may be repeated from the first iteration step. At the second iteration step, when the hollow space list is maintained, the second iteration step may be repeated during next iteration.

According to another aspect of the present invention, a memory management method in an embedded system is provided. The method may include sequentially allocating and deleting memory starting from a first hollow space and recognizing an area when the memory is allocated as a hollow space list at initial iteration; when the hollow space list is recognized, allocating and deleting the memory in the area of the hollow space list; and when the hollow space list is expanded and re-recognized since the hollow space list may be insufficient, deleting the allocated memory, initializing the hollow space list, and then sequentially allocating the memory from the first hollow space.

According to the memory management method in an embedded system as set forth above, it may be possible to prevent memory fragmentation during dynamic memory allocation in an embedded system. In addition, since the hollow space list may be selectively initialized, data in the system may be managed by effectively utilizing resources while maintaining the speed at a maximum level.

BRIEF DESCRIPTION OF THE DRAWINGS

The above and other objects, features and advantages of the present invention will be more clearly understood from the following detailed description when taken in conjunction with the accompanying drawings, in which.

DETAILED DESCRIPTION

Figure 1:
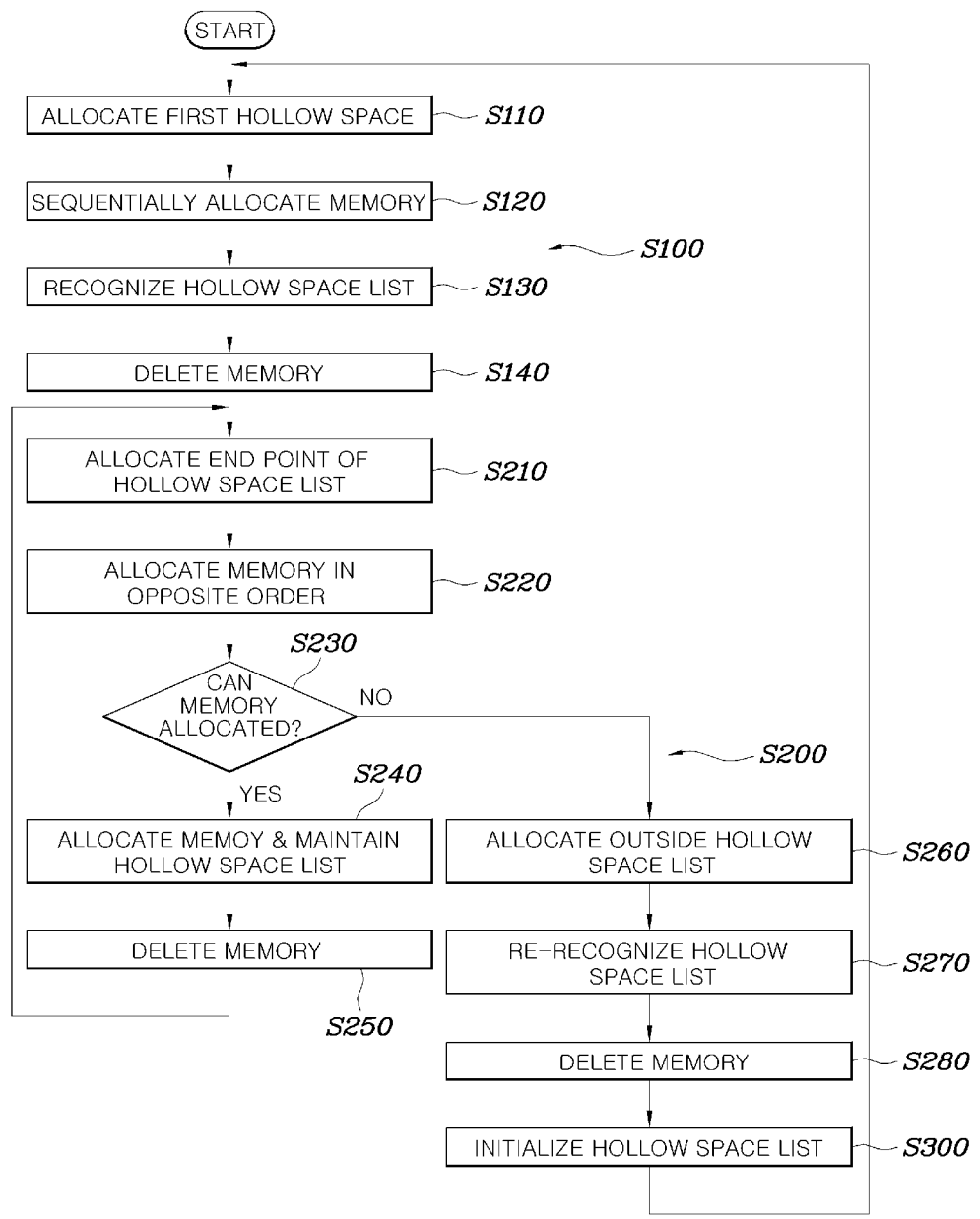
FIG. 1 is an exemplary flowchart showing a memory management method in an embedded system according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Reference will now be made in greater detail to an exemplary embodiment of the present invention, an example of which is illustrated in the accompanying drawings. Wherever possible, the same reference numerals will be used throughout the drawings and the description to refer to the same or like parts.

FIG. 1 is an exemplary flowchart showing a memory management method in an embedded system according to an exemplary embodiment of the present invention, and FIG. 2 to FIG. 6 are exemplary views explaining the memory management method in an embedded system according to an exemplary embodiment of the present invention.

FIG. 1 illustrates the exemplary flowchart of the memory management method in an embedded system according to this exemplary embodiment. The memory management method in an embedded system according to this exemplary embodiment may include a first iteration step S100 of sequentially allocating and deleting, by a processor, memory and recognizing, by the processor, an area when the first to last sections of the memory were located as a hollow space list; a second iteration step S200 of sequentially allocating, by the processor, the memory in an area of the hollow space list by starting memory allocation from an end point of the hollow space list, when the hollow space list is insufficient (e.g., insufficient space is available) during the memory allocation, allocating, by the processor, a section of the memory outside the area of (e.g., beyond) the hollow space list, re-recognizing, by the processor, the hollow space list by expanding to the area where the last section of the memory was located, when the hollow space list is sufficient (e.g., there is sufficient space in the hollow space) during the memory allocation, maintaining the hollow space list, and sequentially deleting, by the processor, the allocated memory; and an initialization step S300 of, when the hollow space list is re-recognized, initializing the hollow space list.

Figure 2:
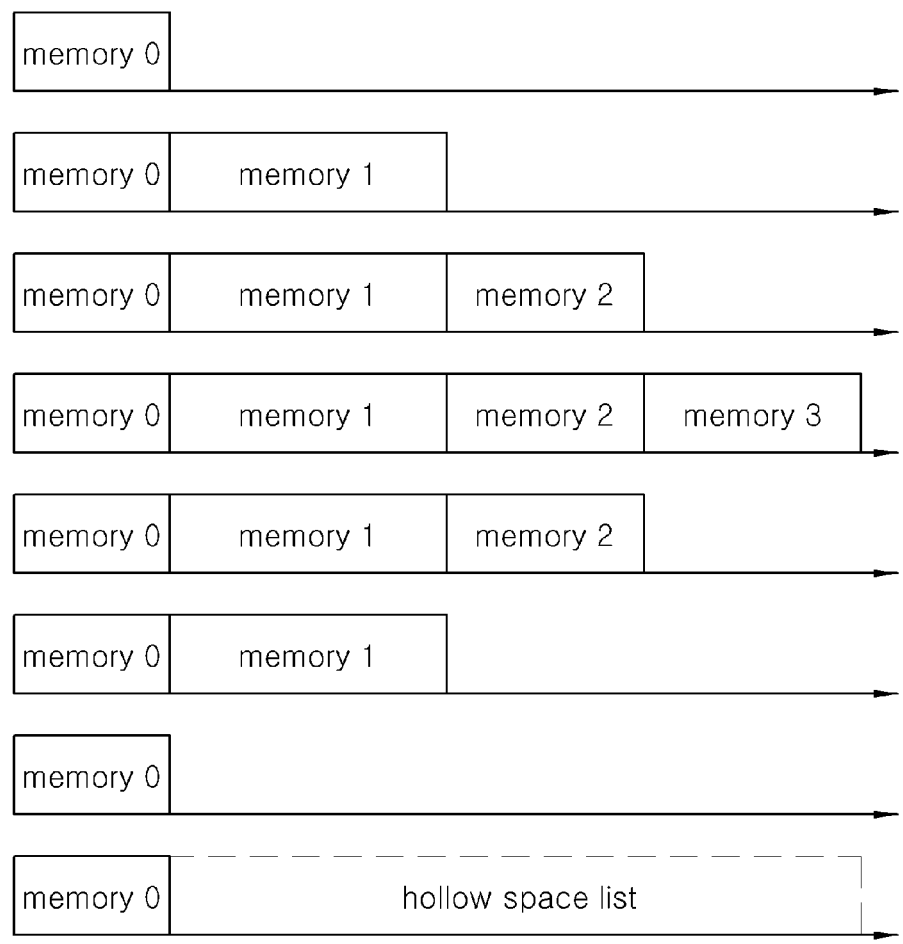
FIGS. 2 to 6 are exemplary views describing the memory management method in an embedded system according to an exemplary embodiment of the present invention.

The present invention relates to dynamic memory allocation, and as shown in FIG. 2, in a typical case, the first iteration step S100 of sequentially allocating and deleting the memory and recognizing the area where the first to last sections of the memory were located as a hollow space list may be performed first. When the memory is allocated at the first iteration step S100, the memory allocation may be initialized from a first hollow space at S110, and after the first hollow space, the memory may be sequentially allocated at S120. When the memory is deleted, the memory may be deleted in the reverse order at S140. Through these processes, the position of the last section of the memory may be stored and recognized by the processor in the hollow space list at S130. Thus, the area when the first to last sections of the memory were located may be recognized by the processor as the hollow space list at S130.

Figure 3:
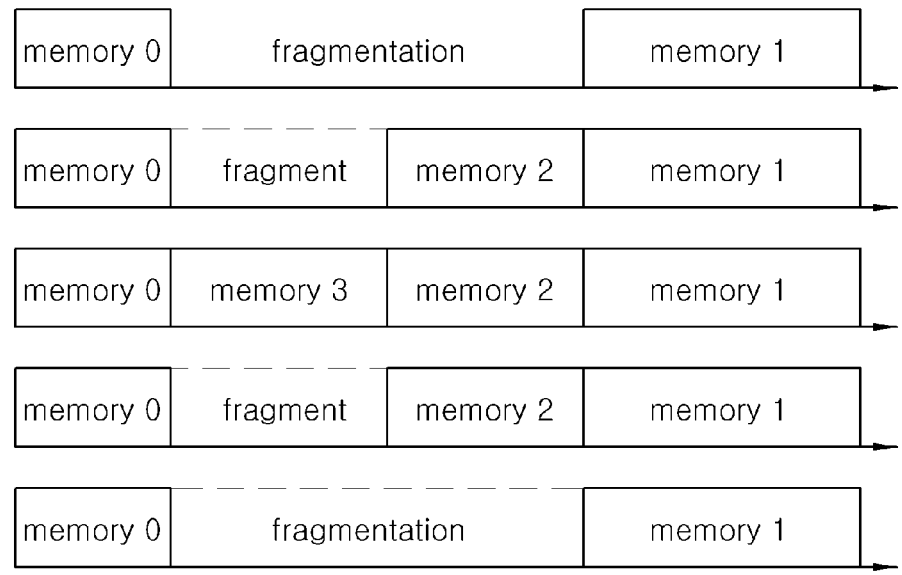

The next iteration may be carried out as illustrated in FIG. 3. In particular, at S210, the memory may be sequentially allocated inside the area of the hollow space list, in which the allocation may be started from the end point of the hollow space list. This may be caused by a difference in management methods, when the end point of the hollow space list may be used as a starting point of the memory allocation, there are advantages in that coding is easier and allocation is faster than in the related art.

Figure 4:
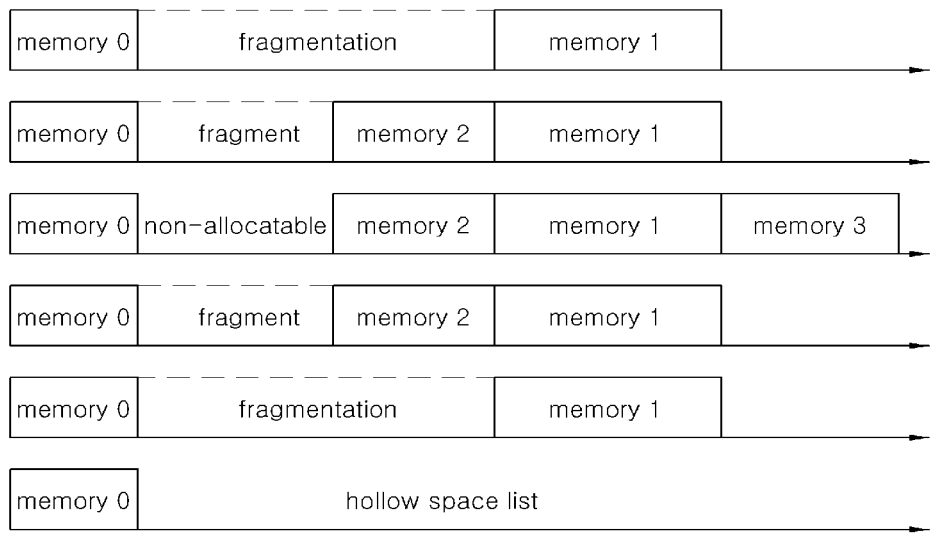
Figure 5:
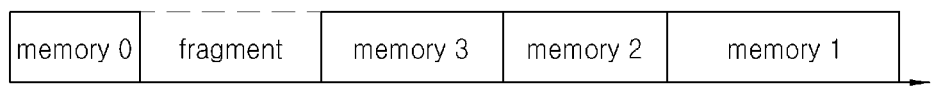

As shown in FIG. 3, when sections of the memory having about the same size are allocated at the next iteration, the processes of allocating the sections of the memory in the hollow space list and sequentially deleting the memory may be repeated at S220 and S250. However, while the memory is being sequentially allocated as shown in FIG. 4, when the last memory section "memory 3" is not allocated to the remaining space due to the large size of the last memory section at S230, that is, when the hollow space list is insufficient during the allocation, the last memory section may be allocated outside the area of (e.g., beyond) the hollow space list at S260, and the hollow space list may be re-recognized by being expanded to the area when the last memory was located at S270. Therefore, the first part of the hollow space list may be fragmented and the final hollow space list may be further expanded, whereby an unnecessarily excessive maximum memory request may occur. In other words, at the second iteration step S200, when the hollow space list is insufficient, the memory section may be allocated to the area outside the end point of the hollow space list at S260.

Therefore, according to this exemplary embodiment, when the hollow space list is sufficient during the allocation, the hollow space list may be maintained and the allocated memory may be sequentially deleted at the second iteration step S200, and when the hollow space list is re-recognized, the hollow space list may be initialized at S300.

At the second iteration step S200, the memory may be sequentially allocated by the processor in the opposite direction from the end point to the starting point of the hollow space list during the memory allocation at S220. Therefore, when the hollow space list is expanded, during the repetition of the iteration, the hollow space list may be maintained to be substantially equal when fragmented at the starting point of the hollow space list. Consequently, according to this exemplary embodiment, when the hollow space list is re-recognized due to the expansion thereof, information regarding the hollow space list may be initialized before the next iteration is performed.

Figure 6:
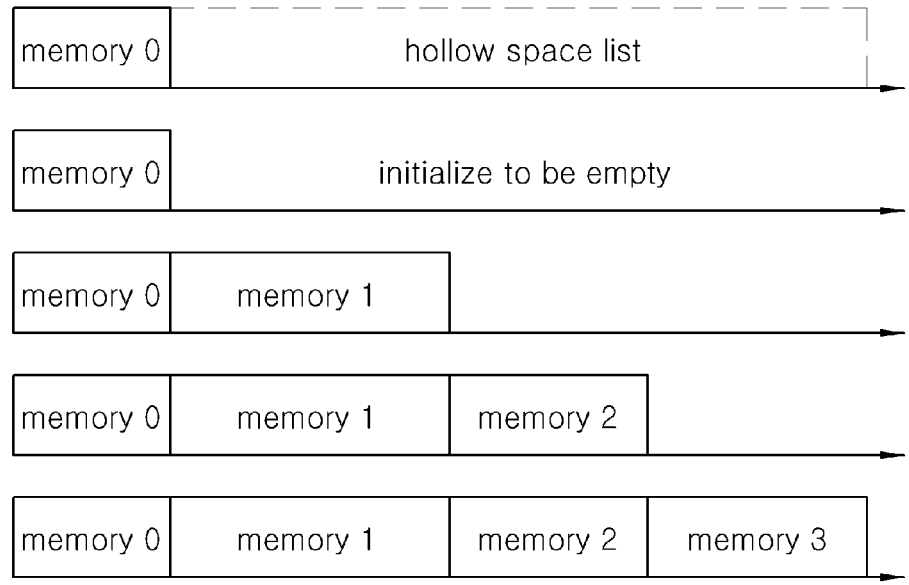

When the hollow space list is initialized in this manner, as shown in FIG. 6, memory allocation may be performed as an initial iteration in which the hollow space list may not be designated. Accordingly, the optimized hollow space list that corresponds to the present state may be recreated. In other words, when the hollow space list is initialized at the initialization step S300, the iteration may be performed again from the first iteration step S100. When the hollow space list is maintained at the second iteration step S200, the second iteration step may be repeated during the next iteration.

The memory management method in an embedded system according to the exemplary embodiment of the present invention may sequentially allocate and delete memory using a processor, starting from a first hollow space and recognize the area where the memory is allocated as a hollow space list at initial iteration; when the hollow space list is recognized, allocate and delete the memory in the area of the hollow space list; and when the hollow space list is expanded and re-recognized due to the hollow space list being insufficient, delete the allocated memory, initialize the hollow space list, and then sequentially allocate the memory from the first hollow space.

Accordingly, substantially faster (e.g., rapid) memory allocation may be possible since the hollow space list is not initialized. When the memory is increased, the hollow space list may be reset and newly created from the next iteration in a corresponding manner, thereby reducing memory fragmentation and loss.

This system may be used in an embedded system in which a fixed amount of data is repeated allocated and deleted. This system may specifically be implemented as a battery management system. In the case of a vehicle battery, since information regarding temperature, current, voltage or the like may be input and stored at every period of time and the state of the battery may be estimated based on this information, a specific capacity of memory may be repeatedly allocated and deleted at every preset period of time. In addition, the memory may be optimally operated in response to any variation in the type or size of that data. Accordingly, it may be possible to effectively cope with a change in control logic or the like.

Although the exemplary embodiments of the present invention have been described for illustrative purposes, those skilled in the art will appreciate that various modifications, additions and substitutions are possible, without departing from the scope and spirit of the present invention as disclosed in the accompanying claims.

What is claimed is:

1. A memory management method in an embedded system, comprising:
    first iteration of sequentially allocating and deleting, by a processor, memory and recognizing an area when the first to last sections of the memory were located as a hollow space list;
    second iteration of sequentially allocating, by the processor, the memory in an area of the hollow space list by starting memory allocation from an end point of the hollow space list, when the hollow space list is insufficient during the memory allocation, allocating a memory section outside the area of the hollow space list, re-recognizing the hollow space list by expanding to the area when the last section of the memory was located, when the hollow space list is sufficient during the memory allocation, maintaining the hollow space list, and sequentially deleting the allocated memory; and
    when the hollow space list is re-recognized, initializing, by the processor, the hollow space list.

2. The memory management method according to claim 1, wherein, at the first iteration, memory allocation starts from a first hollow space and, after the first hollow space, sequentially allocating, by the processor, the memory.

3. The memory management method according to claim 1, wherein, at the second iteration, the memory is sequentially allocated, by the processor, in an opposite direction from an end point to a starting point of the hollow space list.

4. The memory management method according to claim 3, wherein, at the second iteration, when the hollow space list is insufficient, the memory is allocated, by the processor, to an outside area of the end point of the hollow space list.

5. The memory management method according to claim 1, wherein, when the hollow space list is initialized, iteration is repeated from the first iteration.

6. The memory management method according to claim 1, wherein, at the second iteration, when the hollow space list is maintained, the second iteration is repeated during next iteration.

7. A memory management method, comprising:
    sequentially allocating and deleting, by a processor, memory starting from a first hollow space and recognizing, by the processor, an area when the memory is allocated as a hollow space list at initial iteration;
    when the hollow space list is recognized, allocating and deleting, by the processor, the memory in the area of the hollow space list; and
    when the hollow space list is expanded and re-recognized due to the hollow space list being insufficient, deleting, by the processor, the allocated memory, initializing the hollow space list, and then sequentially allocating the memory from the first hollow space.

8. A non-transitory computer readable medium containing program instructions executed by a processor or controller, the computer readable medium comprising: program instructions that perform a first iteration of sequentially allocating and deleting memory and recognizing an area when the first to last sections of the memory were located as a hollow space list;
    program instructions that perform a second iteration of sequentially allocating, the memory in an area of the hollow space list by starting memory allocation from an end point of the hollow space list, when the hollow space list is insufficient during the memory allocation, allocating a memory section outside the area of the hollow space list, re-recognizing the hollow space list by expanding to the area when the last section of the memory was located, when the hollow space list is sufficient during the memory allocation, maintaining the hollow space list, and sequentially deleting the allocated memory; and program instruction that initialize the hollow space list when the hollow space list is re-recognized.

9. The non-transitory computer readable medium of claim 8, wherein, at the first iteration, memory allocation starts from a first hollow space and, after the first hollow space, sequentially allocating the memory.

10. The non-transitory computer readable medium of claim 8, wherein, at the second iteration, the memory is sequentially allocated in an opposite direction from an end point to a starting point of the hollow space list.

11. The non-transitory computer readable medium of claim 10, wherein, at the second iteration, when the hollow space list is insufficient, the memory is allocated to an outside area of the end point of the hollow space list.

12. The non-transitory computer readable medium of claim 8, wherein, when the hollow space list is initialized, iteration is repeated from the first iteration.

13. The non-transitory computer readable medium of claim 8, wherein, at the second iteration, when the hollow space list is maintained, the second iteration is repeated during next iteration.

* * * * *